No. 777,149. PATENTED DEC. 13, 1904.
S. D. SCUDDER.
TRAVELER'S CERTIFIED BANK CHECK.
APPLICATION FILED DEC. 5, 1903.

NO MODEL.

Fig. 1.

| For Identification | IF CASHED BY THE DRAWER hereof [whose description and signature are correctly given for identification in the undetachable margin] AT ANY BANK IN THE UNITED STATES OF AMERICA, CANADA, MEXICO, or EUROPE, within ____ days from our date hereon, the payment of this check is hereby CERTIFIED for any sum properly filled in not exceeding ____ dollars current funds of the UNITED STATES OF AMERICA, for value received. DATED AT ____ 190__ |
|---|---|
| HOME ADDRESS: | PAYABLE AT THE ____ BANK   CERTIFIED by ____ BANK |
| OCCUPATION. | OF ____ |
| AGE; ___ WEIGHT ___ HEIGHT; | ____ PRESIDENT ____ CASHIER |
| MALE or FEMALE | $ ____ 190__ |
| MARRIED or UNMARRIED; | WHERE CASHED   WHEN CASHED |
| COLOR of EYES | Pay to the Order of Myself the sum of ____ Dollars |
| COLOR of HAIR | VALUE RECEIVED, AND CHARGE TO THE ACCOUNT OF |
| IF MALE WHAT HAIR ON FACE | To the ____ BANK |
| SIGNATURE | OF ____ |
| WITNESS   DRAWER; | No. ___ Series ____   THIS CHECK MUST BE ALSO ENDORSED ON THE BACK   DRAWER |

Fig. 2.

PAY TO THE ORDER OF THE ____ BANK ____ OF ____

DRAWER

Inventor
S.D. Scudder,

Witnesses
Geo. Ackerman Jr.
Chas. S. Hyer

By Victor J. Evans
Attorney

No. 777,149.                                                           Patented December 13, 1904.

UNITED STATES PATENT OFFICE.

SILAS D. SCUDDER, OF NEW YORK, N. Y.

TRAVELER'S CERTIFIED BANK-CHECK.

SPECIFICATION forming part of Letters Patent No. 777,149, dated December 13, 1904.

Application filed December 5, 1903. Serial No. 184,000. (No model.)

*To all whom it may concern:*

Be it known that I, SILAS D. SCUDDER, a citizen of the United States, residing at New York, in the county of New York and State of New York, have invented new and useful Improvements in Travelers' Certified Bank-Checks, of which the following is a specification.

This invention relates to a traveler's certified bank-check adapted for use by those touring through different places and desiring to obtain funds without the inconvenience and delays incident to the ordinary method of identification and avoiding the necessity of procuring "letters of credit," particularly in foreign countries.

The invention consists in the arrangement of a check or negotiable paper, which will be hereinafter more fully set forth.

In the drawings, Figure 1 is a plan view of the obverse side of a check embodying the features of the invention. Fig. 2 is a similar view of the reverse side of the check.

Similar numerals of reference are employed to indicate corresponding parts in the views.

The check consists of a strip 1 of suitable paper having such dimensions as will adapt it to receive the matter to be printed thereon. The check may be said to be divided into three parts on its obverse side—a certification 2, a check 3, and an undetachable identification margin or coupon 4. The certification 2 and check 3 occupy the main body of the strip, and the former is arranged above the latter. The certification contains instructions as to the use of the device as an entirety, provided the bearer of the paper corresponds to the identification matter displayed by the margin or coupon 4. The bank certification also has matter thereon to positively designate the number of days from the date of the same that the device as an entirety holds good or is negotiable and also the place and date of issue, the name of the bank responsible for the certification, and a place for the signatures of the president and cashier of the bank holding the funds, as well as the means for designating on what bank the check 3 may be drawn. The check 3 is of the usual form of devices of this class, and immediately below the place for the signature of the drawer are instructions to the effect that the entire paper must be indorsed on the back. This check also includes spaces to indicate when and where it was cashed. The identification margin or coupon 4 has at the bottom places for the signatures of the drawer and for a witness to the drawer's signature. Above these signatures spaces are defined for the home address, occupation, age, weight, height, sex, complexion, and facial characteristics of the drawer and whether the latter is married or unmarried. On the reverse side of the strip 1, extending transversely thereover near one end and occupying a portion of the space taken up by parts of the certification and check on the obverse side, is an order-blank 5, adapted to be signed by the drawer.

The improved bank-check as an entirety will be found exceptionally useful and convenient, and a number of the same may be issued at one time, if desired, to accommodate a traveler in different parts of his own or other countries. The bank or money-depository honoring the check or draft when presented by the proper party will immediately send the same for collection through proper channels to the bank certified against.

Though care has been taken to reduce the matter on the certification 2 and check proper, 3, as well as the identification margin or coupon 4, to a minimum, it will be understood that changes within the purview of the invention may be made therein.

Having thus fully described the invention, what is claimed as new is—

A traveler's certified bank-check, having identification matter at one end thereof, a bank certification extending longitudinally of the check and referring to the identification matter thereon, a check proper extending longitudinally of the check, and an order-blank on the reverse side thereof.

In testimony whereof I affix my signature in presence of two witnesses.

SILAS D. SCUDDER.

Witnesses:
M. F. LONG,
GEORGE C. HOLTON.